(12) United States Patent
Wei et al.

(10) Patent No.: US 9,713,060 B2
(45) Date of Patent: Jul. 18, 2017

(54) SMALL CELL INITIAL ACCESS AND PHYSICAL CELL IDENTITY DETERMINATION

(71) Applicant: Avago Technologies General IP (Singapore) Pte. Ltd., Singapore (SG)

(72) Inventors: Na Wei, Beijing (CN); Pengfei Sun, Beijing (CN); Erlin Zeng, Beijing (CN); Chunyan Gao, Beijing (CN); Wei Bai, Beijing (CN); Haiming Wang, Beijing (CN); Wei Hong, Beijing (CN); Lili Zhang, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/440,813

(22) PCT Filed: Nov. 7, 2012

(86) PCT No.: PCT/CN2012/084197
§ 371 (c)(1),
(2) Date: May 5, 2015

(87) PCT Pub. No.: WO2014/071562
PCT Pub. Date: May 15, 2014

(65) Prior Publication Data
US 2015/0304932 A1      Oct. 22, 2015

(51) Int. Cl.
*H04W 4/00*       (2009.01)
*H04W 36/32*    (2009.01)
(Continued)

(52) U.S. Cl.
CPC ......... *H04W 36/32* (2013.01); *H04J 11/0069* (2013.01); *H04J 11/0079* (2013.01);
(Continued)

(58) Field of Classification Search
None
See application file for complete search history.

(56) References Cited

U.S. PATENT DOCUMENTS

| | | | |
|---|---|---|---|
| 2013/0235818 A1* | 9/2013 | Yuan | H04L 25/0202 370/329 |
| 2013/0258958 A1* | 10/2013 | Dinan | H04W 56/0045 370/329 |
| 2014/0036755 A1* | 2/2014 | Lee | H04W 36/26 370/312 |

* cited by examiner

*Primary Examiner* — Minh-Trang Nguyen
(74) *Attorney, Agent, or Firm* — Foley & Lardner LLP

(57) ABSTRACT

A method, system, and computer program product that provides a two-index system for clusters of small cells in a wireless network. A first index is employed for access to and identification of a serving cell within a cluster of small cells. A second index indicates a group of small cells for determining mobility control. The first index may be derived from primary/secondary synchronization signals, or from frequency/time division multiplex signal position. The second index may be indicated in system/master information block signals or predefined as a plurality of small cells identified by the first index for each cell. Determination of physical cell identification is aided by providing a plurality of primary/secondary synchronization (PSS/SSS) signal alternating configurations with indicator, wherein a maximum number of configurations is predefined. Signaling the PSS/SSS configurations by one of broadcast or dedicated signaling, said signaling indicating whether each configuration is one of periodic or aperiodic alternation.

20 Claims, 9 Drawing Sheets

(51) Int. Cl.
  *H04J 11/00*   (2006.01)
  *H04W 56/00*   (2009.01)
  *H04L 27/26*   (2006.01)

(52) U.S. Cl.
  CPC ....... *H04J 11/0093* (2013.01); *H04W 56/002* (2013.01); *H04J 2211/001* (2013.01); *H04L 27/2692* (2013.01); *H04W 56/00* (2013.01)

SMALL CELL INITIAL ACCESS AND PHYSICAL CELL IDENTITY DETERMINATION

RELATED APPLICATIONS

This application is the U.S. National Stage of and claims priority to and the benefit of International Patent Application Number PCT/CN2012/084197, filed Nov. 7, 2012. The entire contents of the foregoing application are hereby incorporated by reference for all purposes.

TECHNOLOGICAL FIELD

An example embodiment of the present invention relates to the field of wireless cellular network communications, and particularly to cell management in dense small cell deployment.

BACKGROUND

It is expected that data traffic via radio communication doubles per year and that it will increase by one hundred times toward year 2020. If so, then it is a goal for the cellular network to evolve and innovate to meet demand, which means it is necessary to increase capacity and make the platform more compelling.

The evolution of the $3^{rd}$ Generation Partnership Project (3GPP) standard is demonstrated by new features such as enhanced physical downlink control channel (ePDCCH) replacing PDCCH, where the control channel is no longer fixed to certain time-frequency resources, but more flexibly allocated, and the common reference signal (CRS) is at least significantly reduced, if not completely removed. System operation on the New Carrier Type (NCT) is now mostly based on Channel-State Information Reference Signal (CSI-RS) and demodulation reference signal (DM-RS) instead of CRS. Another expected new feature is standalone new carrier type (SA-NCT) which is assumed to be useful to bring more flexibility to cell deployment.

Small Cell Access

A small cell access without macro network node scenario is shown in FIG. 1. A small cell (also "picocell") is simply a network access point with a very small coverage area and, perhaps, lower power radio signal than a standard network node. Small cells may handle only a few, sometimes only one, user equipment connection to a network. Small cells may operate with the full capability of a serving network node or they may require the overall supervision of a macro network node to provide access to a network. In the small cell only 120 scenario of FIG. 1 (without macro cell, compare FIG. 2), the user equipment (UE) 130 is expected to change its access node without handover. The major advantages are no extensive cell planning needed, and higher capacity is widely available for mobile terminals.

Another scenario features stand-alone long-term evolved (LTE) local area frequency layer and local area enhancements with an LTE macro cell present but no assistance assumed. However for this very attractive deployment there are still a few open issues.

First, how does UE tell one node's initial access signal from other nodes? For example, if all nodes transmit same primary synchronization signal/secondary synchronization signal (PSS/SSS), those signals will arrive with different timing at UE, therefore UE cannot find the correct downlink (DL) sync signal. On the other hand, if only a few small nodes are allowed to transmit PSS/SSS for cell ID, then maybe little or no interference will occur, but it might introduce a coverage problem for initial access. If different PSS/SSS signals are used for small nodes, another issue arises.

Second, how is UE handover (HO) among these small cells prevented? For such dense small cell deployment, reducing unnecessary handover is critical. It is desirable to have small cells in one region configured as one large cell, so that changing small cell to small cell is just an intra-cell radio resource configuration (RRC) reconfiguration instead of handover.

In traditional LTE design, the cell ID obtained from PSS/SSS detection serves two purposes; one is to link with a certain CRS pattern, and another is to support mobility (e.g., measurement, re-select, handover). This makes the two issues above contradict each other. The objective of a solution is to provide initial access to UE in any node of a small cell group and to avoid frequent handoff (HO) among the small cells when UE's mobility (that is, movement among the small cells) is moderate or even high.

Dense Small Cell Deployment Scenarios

A dense small cell deployment as illustrated in FIG. 2 has potential for handling the expected increase in wireless traffic. FIG. 2 depicts a macro network node 200 overseeing a collection of small cells (pico cells) 120. UE 130 within the small cell coverage area is handled by the small cell 120 having the best signal relation to the UE 130. According to some theorists there can be 1:1 ratio between serving nodes (small cells) and active users. In such dense deployment, it is highly desired that cell planning efforts can be reduced. At the same time, cell identification and interference mitigation need to be considered to maintain the gain from small cell deployment.

Though small cell deployment had been considered as promising to meet the capacity requirement to the network and is seen as helpful for data offloading, the dense small cell deployment also brings many problems to be solved. As shown in FIG. 2, the small cells 120 are geographically separated from the macro evolved node B (eNB) and in most case are unsynchronized to the macro cell. To enable synchronization in this scenario, the synchronization signal, PSS/SSS, is required to be sent by both macro and pico cells. Since the inter-site distance (ISD) between the pico cells can be very small, the PSS/SSS interference from other pico cells is a problem to be considered in this scenario. Beside the small ISD, there is the possibility that pico eNB has a different transmission power level, typically 30 to 37 dbm or even 24 dbm. Different Cellular Radio Exchange (CRE) bias values may be applied for neighboring pico eNBs, but it may aggravate the interference of PSS/SSS from the neighboring pico cells.

Another problem is that for mobility and for interference mitigation, the UE needs to report to the serving eNB a measured signal power and the Physical Cell Identity (PCI) for each detected neighbor cell. If two neighbor cells are with same PCI, then they cannot be distinguished. Then the allocation of the PCI has to meet the following principles:

Collision free, which means cells with coverage overlap should not have the same PCI, otherwise, the mobile terminal (MT) located in the common coverage of the two cells may not be able to decode the channels of the serving base station;

Confusion free, which means two or more neighbors of one serving cell should not have the same PCI, otherwise the serving eNB may not be able to determine the target base station (BS) during handover.

Assuming the same PSS/SSS design as in the current LTE specification (Rel. 11), there are a total of 504 PCIs available. In dense small cell deployment, the collision rate of the PCI and PSS/SSS may increase and cause an interference problem. To reduce cell planning efforts, the PSS/SSS can be chosen by cells after some advanced detection on the PSS/SSS resource utilized by neighbor cells. However, due to the coverage limitation, another cell using the same PSS/SSS may not be detected by one eNB, but it can cause interference to cell-edge UEs. PCI can be derived from the PSS/SSS sequence and be used in physical layer for initialization of many sequence generation (CRS, digital reference signals (DRS), physical uplink control channel (PUCCH) resequence, etc.) but accidental PCI collision may result in interference on other signals.

BRIEF SUMMARY

A method for providing a two-index system for clusters of small cells in a wireless cellular network is described, wherein a first index is employed for access to and identification of an individual serving cell within a cluster of small cells, and a second index is employed to indicate a group of small cells for determining mobility control. The method may also comprise deriving the first index from primary synchronization/secondary synchronization (PSS/SSS) signals, or deriving the first index from a frequency division/time division multiplex (FDM/TDM) signal position of primary/secondary synchronization signals. The method may further comprise indicating the second index through system information/master information block signals, predefining the second index as comprising a plurality of small cells identified by the first index for each small cell, or deriving the second index from primary/secondary synchronization (PSS/SSS) signals.

The index method may also include causing an indication to be communicated in downlink signaling that the small cells comprise a two-index cell system. Further features of example embodiments of the method comprise defining a plurality of primary/secondary synchronization (PSS/SSS) signal configurations, each having an indicator, wherein each configuration has a different time/frequency position depending on whether the PSS/SSS signal is time or frequency division multiplexed, the time/frequency for each defined signal configuration of PSS/SSS is orthogonal to each other, and deriving a physical cell identification (PCI) after PSS/SSS detection based on the PSS/SSS sequence and the configuration indicator.

Alternatively, the method may comprise causing a plurality of primary/secondary synchronization (PSS/SSS) signal alternating configurations to be provided, each having an indicator, wherein a maximum number of configurations is predefined, causing the PSS/SSS configurations to be signaled by one of broadcast or dedicated signaling. The signaling indicates whether each configuration is one of periodic or aperiodic alternation. The method may include deriving physical cell identification (PCI) after PSS/SSS detection based on the detected PSS/SSS configuration and the plurality of PSS/SSS configurations.

An apparatus for enhancing access to small cell networks and determining physical cell identification is provided comprising at least one processor, a digital memory associated with the at least one processor, said memory storing computer code instructions which, when executed by the at least one processor, cause the apparatus to provide a two-index system for clusters of small cells in a wireless cellular network, wherein a first index is employed for access to and identification of an individual serving cell within a cluster of small cells. A second index is employed to indicate a group of small cells for determining mobility control.

The apparatus may comprise instructions for deriving the first index from primary synchronization/secondary synchronization (PSS/SSS) signals, or instructions for deriving the first index from a frequency division/time division multiplex (FDM/TDM) signal position of primary/secondary synchronization signals. The second index may be indicated by system information/master information block signals, or may be predefined as comprising a plurality of small cells identified by the first index for each small cell. Further instructions may cause the apparatus to derive the second index from primary/secondary synchronization (PSS/SSS) signals, and cause an indication to be communicated in downlink signaling that the small cells comprise a two-index cell system.

The apparatus may further comprise instructions that cause the apparatus to define a plurality of primary/secondary synchronization (PSS/SSS) signal configurations, each having an indicator, wherein each configuration has a different time/frequency position depending on whether the PSS/SSS signal is time or frequency division multiplexed. Further instructions may cause the apparatus to provide the time/frequency for each defined signal configuration of PSS/SSS orthogonal to each other, and to derive a physical cell identification (PCI) after PSS/SSS detection based on the PSS/SSS sequence and the configuration indicator.

Alternatively, the apparatus may comprise instructions that cause the apparatus to cause a plurality of primary/secondary synchronization (PSS/SSS) signal alternating configurations to be provided, each having an indicator, wherein a maximum number of configurations is predefined, cause the PSS/SSS configurations to be signaled by one of broadcast or dedicated signaling, said signaling indicating whether each configuration is one of periodic or aperiodic alternation, and derive physical cell identification (PCI) after PSS/SSS detection based on the detected PSS/SSS configuration and the plurality of PSS/SSS configurations.

Also described is a computer program product comprising a non-transitory computer readable medium having computer program instructions stored therein, said instructions, executed by at least one processor, causing an apparatus to perform providing a two-index system for clusters of small cells in a wireless cellular network, wherein a first index is employed for access to and identification of an individual serving cell within a cluster of small cells, and a second index is employed to indicate a group of small cells for determining mobility control.

Computer program instructions may further cause an apparatus to derive the first index from primary synchronization/secondary synchronization (PSS/SSS) signals, or to derive the first index from a frequency division/time division multiplex (FDM/TDM) signal position of primary/secondary synchronization signals. The computer program instructions may further cause an apparatus to cause the second index to be indicated through system information/master information block signals, or to derive the second index from primary/secondary synchronization (PSS/SSS) signals.

Further instructions may cause the apparatus to define a plurality of primary/secondary synchronization (PSS/SSS) signal configurations, each having an indicator, wherein each configuration has a different time/frequency position depending on whether the PSS/SSS signal is time or frequency division multiplexed, with the time/frequency for each defined signal configuration of PSS/SSS being orthogonal to each other, and to derive a physical cell identification (PCI) after PSS/SSS detection based on the PSS/SSS sequence and the configuration indicator.

The computer program product comprises instructions may further cause an apparatus to cause a plurality of primary/secondary synchronization (PSS/SSS) signal alternating configurations to be provided, each having an indicator, wherein a maximum number of configurations is predefined, to cause the PSS/SSS configurations to be signaled by one of broadcast or dedicated signaling, said signaling indicating whether each configuration is one of periodic or aperiodic alternation, and to derive physical cell identification (PCI) after PSS/SSS detection based on the detected PSS/SSS configuration and the plurality of PSS/SSS configurations.

An alternative embodiment is an apparatus comprising means for providing a two-index protocol for clusters of small cells in a wireless cellular network, wherein a first index is employed for access to and identification of an individual serving cell within a cluster of small cells, and a second index is employed to indicate a group of small cells for determining mobility control. The apparatus may further comprise means for deriving the first index from primary synchronization/secondary synchronization (PSS/SSS) signals, and means for deriving the first index from a frequency division/time division multiplex (FDM/TDM) signal position of primary/secondary synchronization signals.

The apparatus may include means for indicating the second index through system information/master information block signals, or alternatively means for predefining the second index as comprising a plurality of small cells identified by the first index for each small cell and means for deriving the second index from primary/secondary synchronization (PSS/SSS) signals. The apparatus may further comprise means for causing in indication to be communicated in downlink signaling that the small cells comprise a two-index cell system. The apparatus may comprise means for determining physical cell identification comprising means for defining a plurality of primary/secondary synchronization (PSS/SSS) signal configurations, each having an indicator, wherein each configuration has a different time/frequency position depending on whether the PSS/SSS signal is time or frequency division multiplexed, and wherein the time/frequency for each defined signal configuration of PSS/SSS is orthogonal to each other. The apparatus may comprise means for deriving a physical cell identification (PCI) after PSS/SSS detection based on the PSS/SSS sequence and the configuration indicator.

Alternatively, the apparatus may comprise means for causing a plurality of primary/secondary synchronization (PSS/SSS) signal alternating configurations to be provided, each having an indicator, wherein a maximum number of configurations is predefined; and means for causing the PSS/SSS configurations to be signaled by one of broadcast or dedicated signaling, said signaling indicating whether each configuration is one of periodic or aperiodic alternation; and means for deriving physical cell identification (PCI) after PSS/SSS detection based on the detected PSS/SSS configuration and the plurality of PSS/SSS configurations.

BRIEF DESCRIPTION OF THE SEVERAL VIEWS OF THE DRAWINGS

Figure 1:
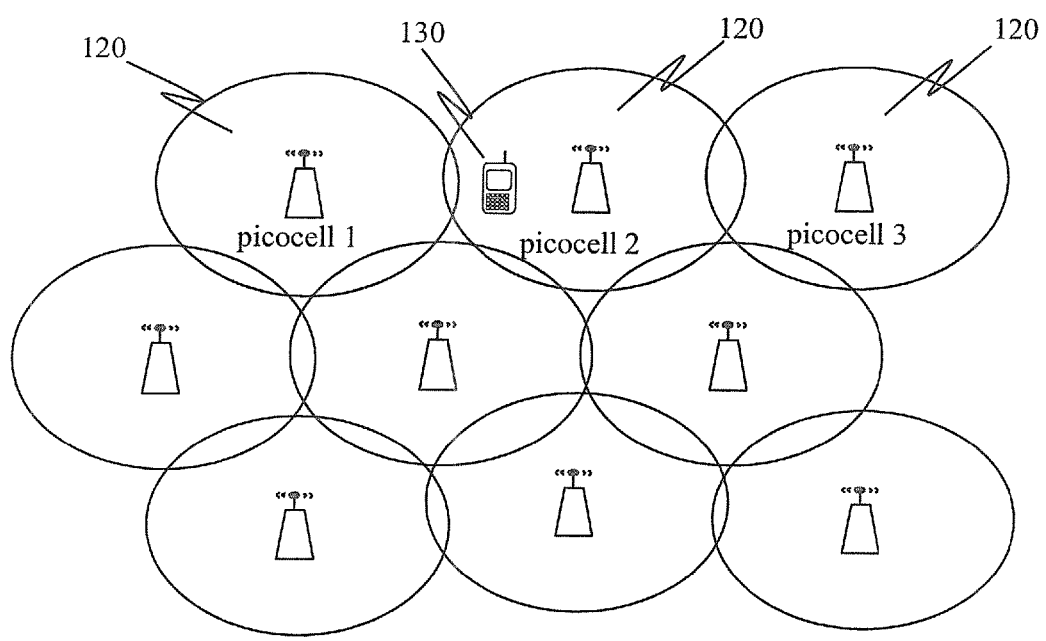

Having thus described various embodiments in general terms, reference will now be made to the accompanying drawings, which are not necessarily drawn to scale, and wherein:

FIG. 1 is a schematic drawing of an example network of small cells.

Figure 2:
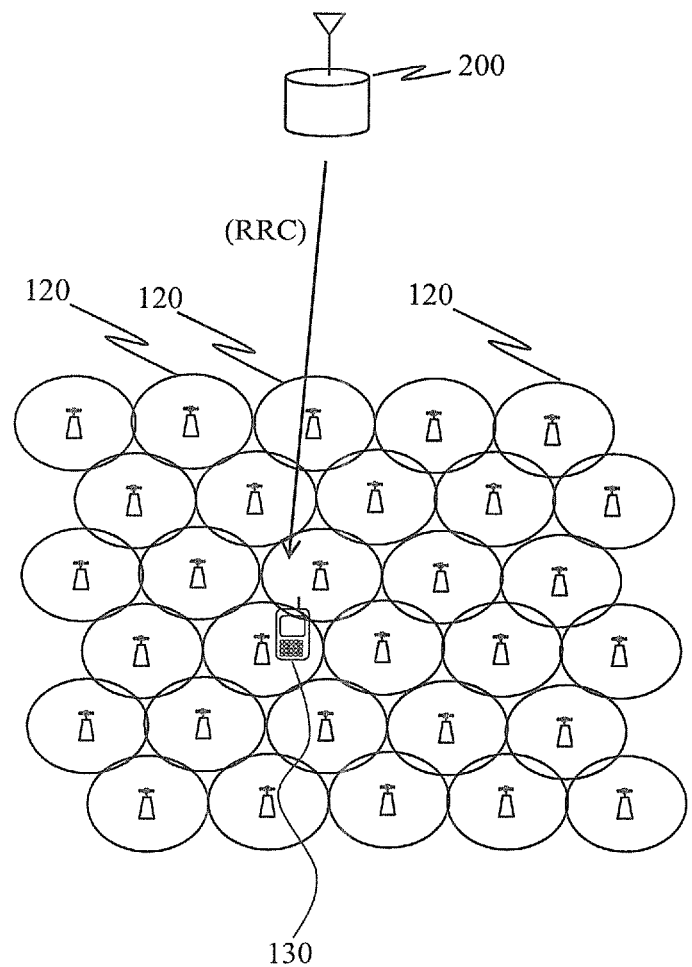

FIG. 2 is a schematic drawing of an example network of small cells with a managing network node, with a mobile terminal within the small cell network.

Figure 3:
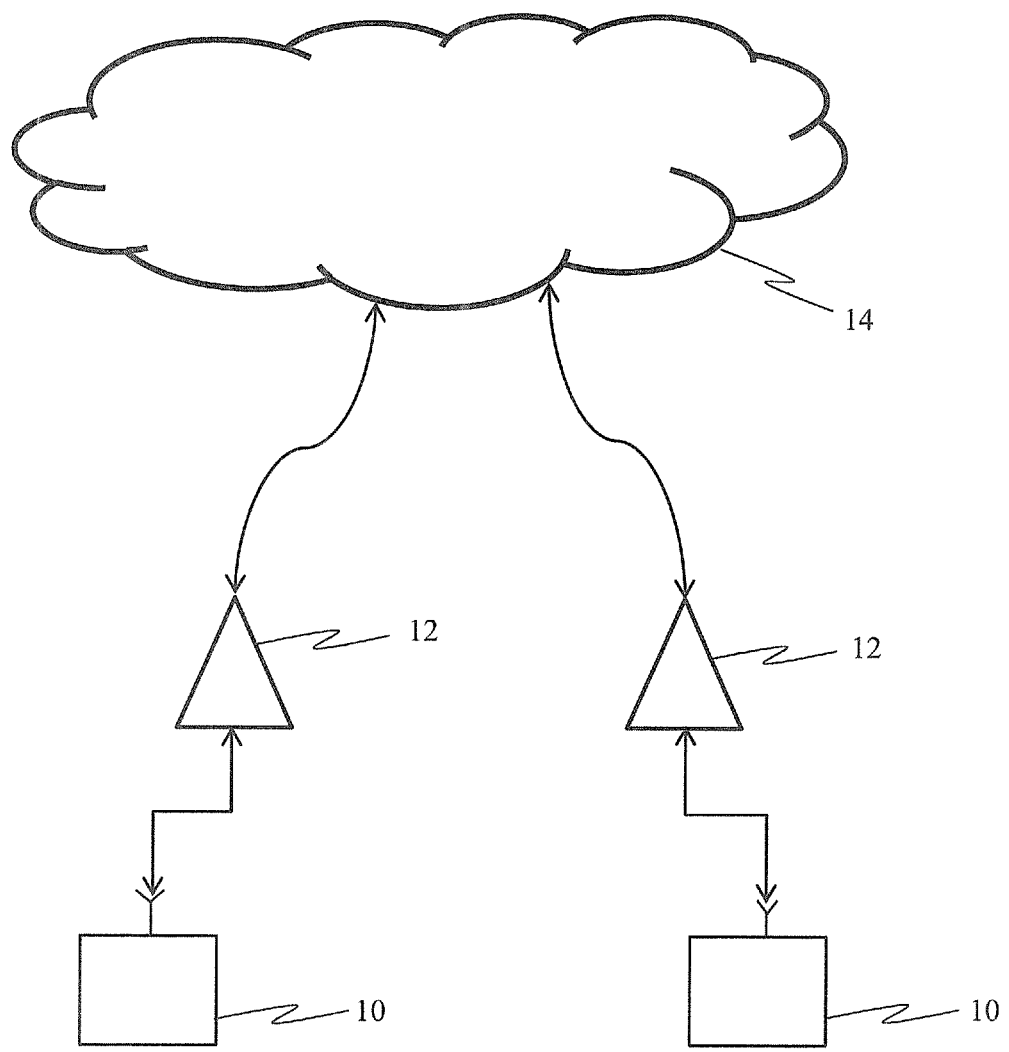

FIG. 3 is a schematic drawing of a simplified wireless network comprising represenations of mobile terminals, access points, and the network infrastructure that may support communications in accordance with an example embodiment of the present invention.

Figure 4:
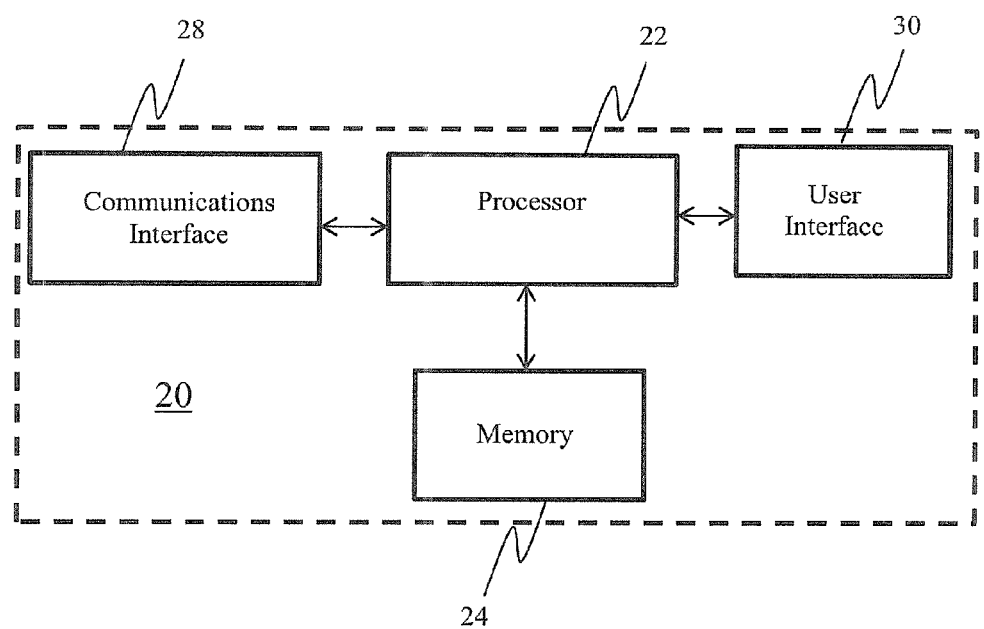

FIG. 4 is a block diagram of an apparatus that may be embodied by a mobile terminal or a network node and that may be specifically configured in accordance with an example embodiment of the present invention.

Figure 5:
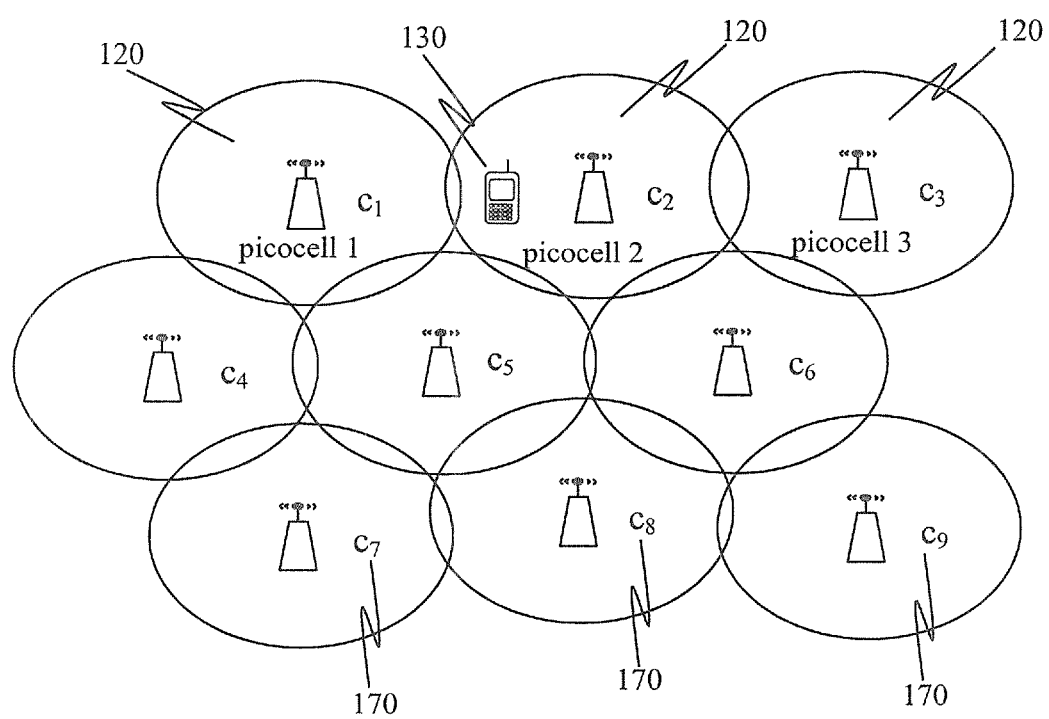

FIG. 5 is a schematic drawing of an example network of small cells with first index identifiers in accordance with an example embodiment of the present invention.

Figure 6:
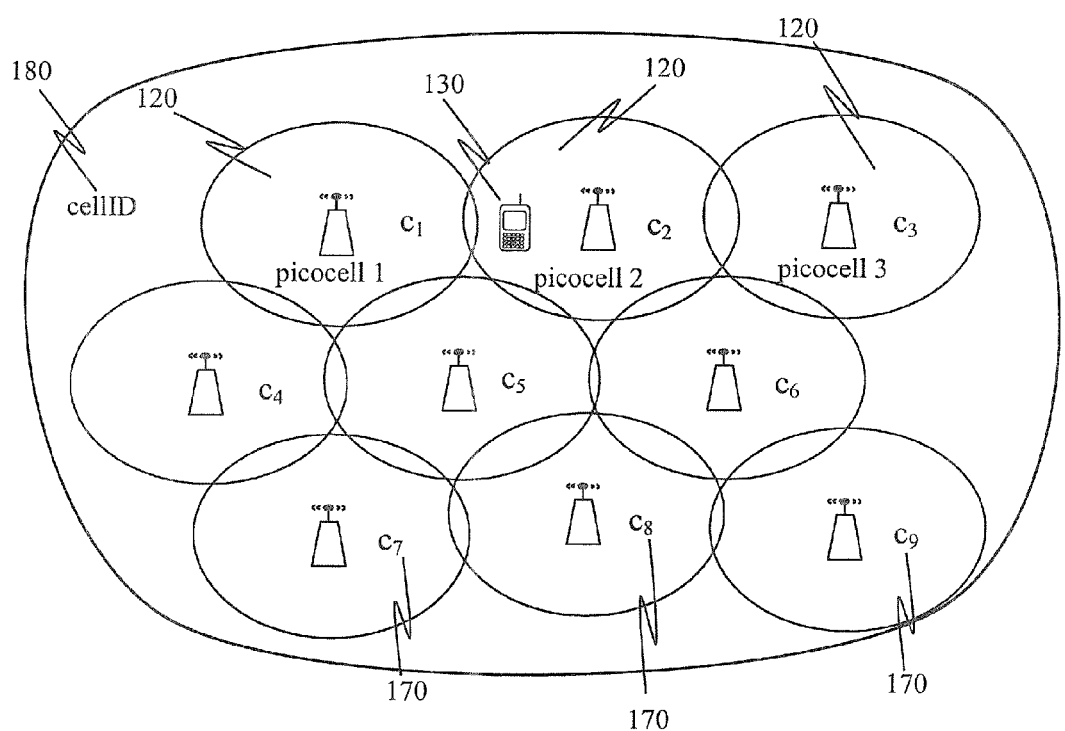

FIG. 6 is a schematic drawing of an example network of small cells with a second index identifier in accordance with an example embodiment of the present invention.

Figure 7:
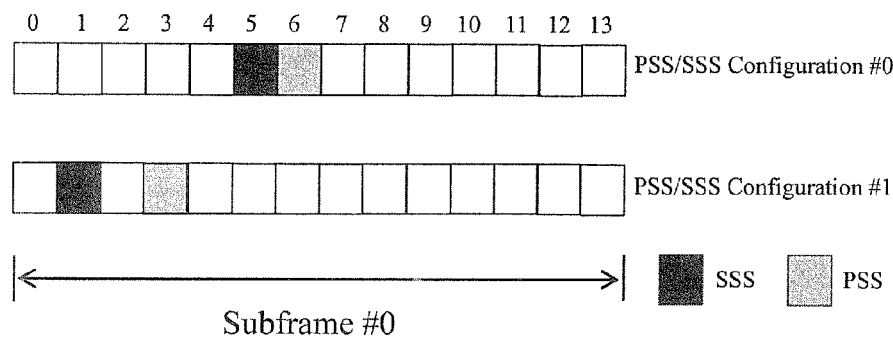

FIG. 7 is a block timing diagram of primary and secondary synchronization sequences in two alternative PSS/SSS configurations in accordance with example embodiments of the present invention.

Figure 8:
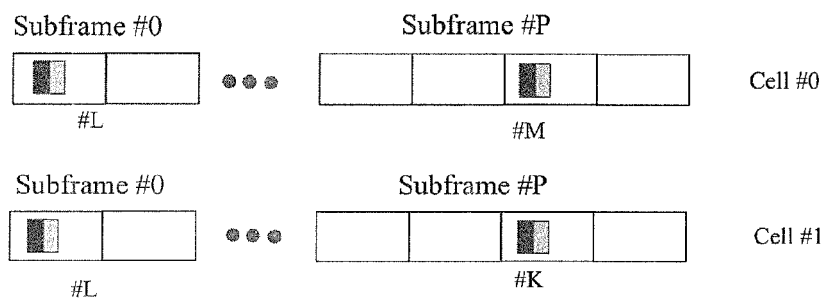

FIG. 8 is a block timing diagram of changing PSS/SSS time within subframe signaling where two cells may initially select the same PSS/SSS configuration and sequence, causing collision and interference.

Figure 9:
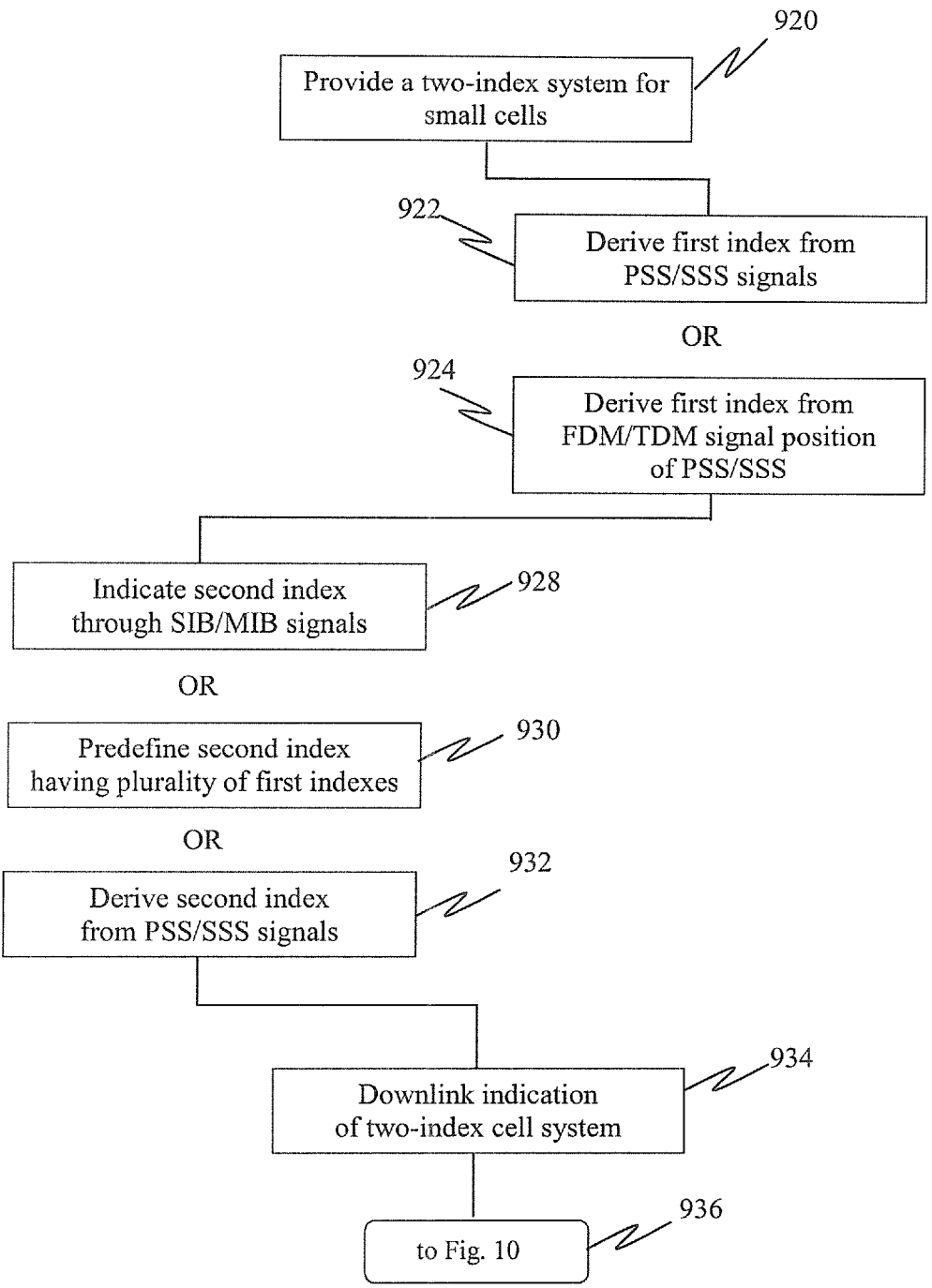

FIG. 9 is a flow diagram of a two-index small cell identification and access process in accordance with an example embodiment of the present invention.

Figure 10:
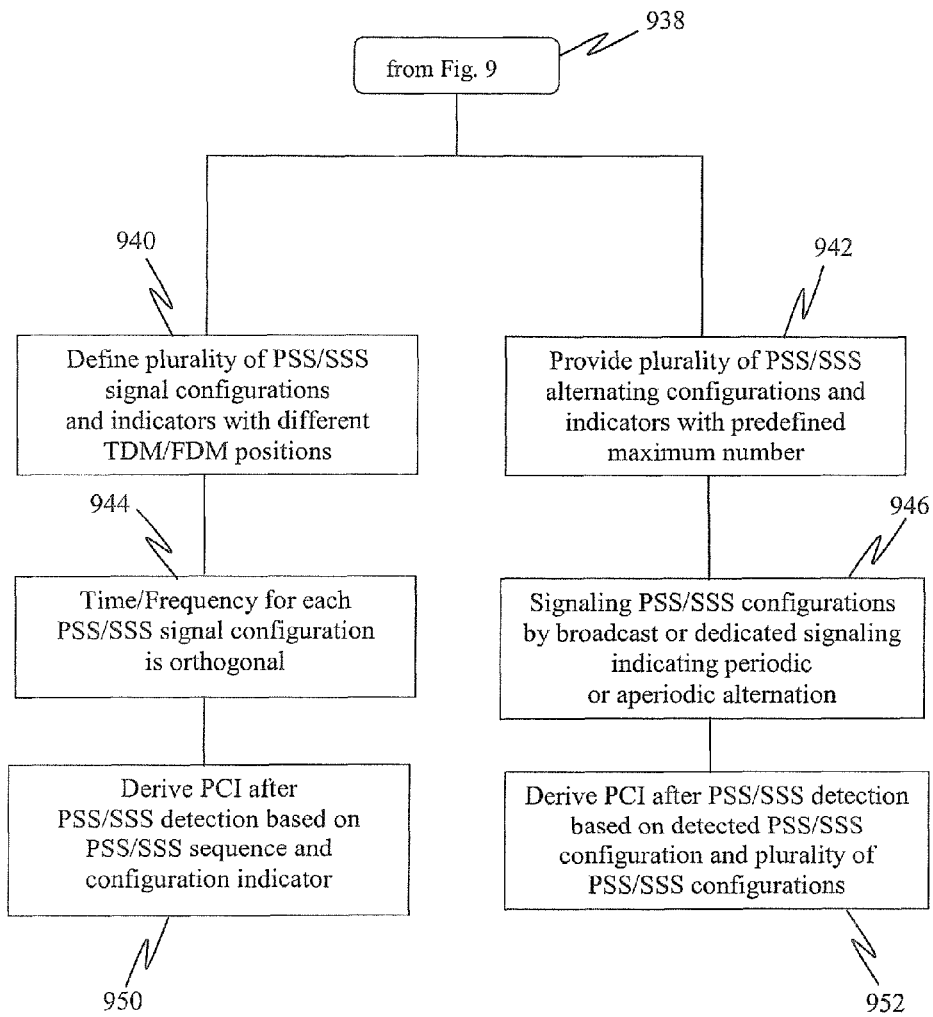

FIG. 10 is a flow diagram of a process for defining and signaling PSS/SSS signal configurations to assist in deriving physical cell identity in small cell networks in accordance with an example embodiment of the present invention.

DETAILED DESCRIPTION

Example embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or a server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Referring now to FIG. 3, mobile terminals 10 may communicate with a network 14 utilizing an uplink from the mobile terminal 10 to the network 14 and a downlink from the network 14 to the mobile terminal. The mobile terminals 10 may be of various types of mobile communication devices such as, for example, mobile telephones, personal digital assistants (PDAs), pagers, laptop computers, tablet computers or any of numerous other hand held or portable communication devices, computation devices, content generation devices, content consumption devices, or combinations thereof, generally termed "user equipment" (UE).

The mobile terminal 10 may communicate with a network via an access point 12, such as a Node B, an evolved Node B (eNB), a base station, a small cell or the like, each of which comprises a radio frequency transmitter and receiver. The mobile terminal 10 may communicate with various types of networks 14 including, for example, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, a Universal Terrestrial Radio Access Network (UTRAN), a GSM Edge Radio Access Network (GERAN) or other type of network.

Referring to FIG. 4, an apparatus 20 that may be embodied by or otherwise associated with a mobile terminal 10 may include or otherwise be in communication with a processor 22, a memory device 24, a communication interface 28, and a user interface 30.

In some example embodiments, the processor 22 (and/or co-processors or any other processing circuitry assisting or otherwise associated with the processor) may be in communication with the memory device 24 via a bus for passing information among components of the apparatus 20. The memory device 24 may include, for example, one or more non-transitory volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device 24 could be configured to store instructions for execution by the processor 22.

The apparatus 20 may, in some embodiments, be embodied by a mobile terminal 10. However, in some embodiments, the apparatus 20 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 20 may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a mobile terminal 10, the processor may be embodied by the processor of the mobile terminal.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal 10) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 28 may be any means such as a device or circuitry embodied in either hardware or a combination of hardware and software that is configured to receive and/or transmit data from/to a network 14 and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In order to support multiple active connections simultaneously, such as in conjunction with a digital super directional array (DSDA) device, the communications interface of one embodiment may include a plurality of cellular radios, such as a plurality of radio front ends and a plurality of base band chains. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Apparatus 20 may also or alternatively be embodied as an access point, such as an eNB, particularly as to the communications interface 28, the processor 22 and the memory 24. Apparatus 20 may also or alternatively be embodied as a pico (small) cell 120 (FIG. 1). In these embodiments the user interface is normally not present.

In some example embodiments, such as instances in which the apparatus 20 is embodied by a mobile terminal 10, the apparatus may also include a user interface 30 that may, in turn, be in communication with the processor 22 to receive an indication of a user input and/or to cause provision of an audible, visual, mechanical or other output to the user. As such, the user interface may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device and/or the like).

In the apparatus embodied by a mobile terminal 10, an eNB 12, or a picocell 120, the processor 22 is the means for executing various functions that may be specified for preparing the mobile terminal, eNB or picocell for network communications. The memory device 24 may contain program code instructions causing the processor to execute the various functions, or the processor may have memory associated with it that contains the program code instructions. Thus, the means for executing various functions in the mobile terminal, eNB or picocell may include the processor and/or the memory with computer code instructions stored therein, such as the functions represented by blocks 920-932 of FIG. 9 and blocks 940, 950 and 952 of FIG. 10. The processor and/or the communications interface 28 is the means for transmitting and receiving signals between a mobile terminal 10 and a network entity 12 (eNB, picocell), such as illustrated by block 934 of FIG. 9 and blocks 942 and 946 of FIG. 10, that are then processed to determine appropriate functions to be executed by the processor.

Small Cell Access (No Macro Network Node)

Two-indexing systems are presented for a new scenario in which a large number of small cells provide a coverage area without the supervision of a macro network node. See FIG. 5. A node index 170 will be used only for access and identification of the individual serving small cell. That is, similar to PCI, the node index is indicates a certain CRS (CSI-RS) pattern and relevant physical layer procedures, for example, determination of scrambling, uplink (UL) channel parameters, etc. The node index 170 uniquely identifies a single small cell. (Note: the index may be any value, not necessarily as shown in FIG. 5, as long as it is unique.) UE may perform measurement for each node separately and report to eNB based on the node index of each small cell. The node index 170 can be derived from PSS/SSS, or can be derived from frequency division multiplexing/time division multiplexing (FDM/TDM) position of PSS/SSS.

A cell identification (cell ID) identifies a group of small cell nodes and is used only for mobility purpose. See FIG. 6. That is, an individual serving access node (small cell) change will not trigger cell reselection or handover as long as the cell ID 180 is the same. The change of serving node becomes a radio resource control (RRC) reconfiguration procedure. The cell ID 180 can be indicated through the system information block or master information block (SIB/MIB), or a few node indexes may be predefined belonging to one cell ID, or it can be derived from PSS/SSS.

In the case of this scenario co-existing with other scenarios, UE needs to know it is in a multiple-indexing system instead of a traditional one ID system. This could be made a band-specific implicit indication, or can be designated by a certain explicit signal indication.

The indication of a node index can be made by one of multiple methods.

Method#1-1: the node index is derived from within PSS/SSS;

Method#1-2: the node index is derived from the FDM/TDM position of PSS/SSS.

The indication of a cell ID can be made by alternative methods.

If using Method#1-1 for node index, then
    Method#2-1: cell ID is indicated through system/master information block (SIB/MIB).
    Method#2-2: a few node indexes may be predefined as belonging to one cell ID. Once there is UE detection of the node index, the cell ID is implicitly known.

If using Method#1-2,
    Method#2-3: cell ID is derived from PSS/SSS.

Therefore, there can be three alternatives if combining cell ID and node index. The indication of the node index and the cell ID may be provided in other manners with the foregoing methods provided by way of example, but not of limitation.

Alternative 1

The node index may be used for initial network synchronization (PSS/SSS); therefore different nodes transmit different PSS/SSS. The reference signal (RS) pattern is linked to the node index.

After initial access, the UE can identify the cell ID (for mobility purpose). As long as the cell ID remains the same among small cell nodes, UE will not trigger handover/reselection. The UE may be configured to make measurements separately for different nodes during mobility.

Alternative 2

The cell ID is linked to PSS/SSS as legacy from current LTE. And the RS pattern is linked to cell ID. But via dedicated signal or broadcast signal, or predefined, the UE knows cell ID, which consists of several node indexes. Within the same cell ID, the UE does not trigger HO. For example, assuming cell 1 consists of {node 1, 2, 3, 4} and cell 2 consists of {node 5, 6, 7, 8}, when UE moves from node 1 to 4, it will not trigger handover. However, if UE moves from node 1 to 5, it will trigger normal handover process.

The difference between Alternatives 1 and 2 is that UE knows which node indexes are within same cell ID for Alternative 2, while in Alternative 1 UE must read the cell ID to see if the node indexes of individual small cell nodes are in the same collective cell or not.

Alternative 3

Different small cell nodes use different frequency division multiplexed PSS/SSS for node index, but use the same PSS/SSS link to identify cell ID. The node index is a function of the FDM resource index. The RS pattern is linked to the identity of node index. UE needs to know the channel center frequency so it can know the FDM index. Either there is a predefined center frequency or the center frequency is indicated in a control signal such as master information block (MIB).

Co-Existence of the Two-Indexing Scenario and Legacy Scenario

In case of this scenario co-existing with other type of scenarios, UE needs to know it is in a multiple-index scenario instead of a traditional one node ID system. There are several ways to inform UE of this fact.

Method #3-1: A band specific classification or geographic location based classification. For example, for 3.5 GHz there are only two indexing system scenarios, or in China 3.5 GHz only uses two-indexing. Then UE will perform accordingly.

Method #3-2: By certain implicit/explicit indication. This should be indicated to UE in SIB/MIB, so UE knows that for mobility purpose, it must obtain:
1. True cell ID (alternative 1)
2. or get a predefined cell ID group list; (alternative 2)
3. Or to get to know true center frequency, so to find FDM index which link to node index (alternative 3).

Informing the UE that it is in a two-index scenario may be accomplished in other manners with the foregoing methods provided by way of example, but not of limitation.

This two-indexing approach solves the access issues concerning the small cell nodes without macro assistance scenario. It is a flexible deployment scenario for future SA-NCT deployment. One advantage of the two-index embodiment is that it solves the contradicting issues simultaneously. That is, it is able to provide good initial access to UE in any small node, and it avoids frequent HO when UE's mobility is moderate or even high.

PCI Determination in Dense Small Cell Scenarios

In a first embodiment, to avoid PCI collision and signal interference in small cell populations, multiple PSS/SSS configurations are defined, with each configuration differing in time or frequency position, and each time/frequency position is implicitly linked to one offset between PSS and SSS. The time/frequency for each configuration can be orthogonal to each other if inter-cell interference is expected. The offset linked to each time/frequency position helps to avoid ambiguity in time/frequency synchronization. After PSS/SSS detection, UE derives the PCI implicitly based on the PSS/SSS sequence, and the configuration index.

In a second embodiment, multiple PSS/SSS sequences or configurations are used by each cell alternatively, where the maximum number of sequences or configurations can be predefined. eNB can signal the PSS/SSS sequences/configurations to UEs, via broadcast or dedicated signaling. The signaling can indicate whether it is periodic alternation or aperiodic alternation. After PSS/SSS detection, UE derives the PCI implicitly based on the detected PSS/SSS sequence/configuration and the multiple PSS/SSS sequence/configuration selected by eNB. Between the first and second embodiments, the PCI can be determined in both the FIG. 1 and FIG. 2 scenarios (that is, with or without a macro eNB).

Referring to the first embodiment, there are multiple PSS/SSS configurations defined, and each PSS/SSS configuration can be orthogonal in time/frequency position. This improves the PSS/SSS multiplexing capacity. To avoid ambiguity in synchronization an implicit linkage is introduced between the time/frequency position and the gap between PSS and SSS. One example is shown in FIG. 7.

In this example, two PSS/SSS configurations (#0 and #1) are predefined, with configuration #0 being the same as the current PSS/SSS standard. That is, the PSS is located in the last orthogonal frequency division multiplexed (OFDM) symbol and SSS is located in the next to last OFDM symbol in the first slot of subframe #0, and #5 (not shown). In the configuration #1, PSS locates in OFDM symbol #3 and SSS locates in OFDM symbol #1. In the two configurations, the resources for PSS/SSS are orthogonal.

In configuration #0, the PSS and SSS are adjacent without gap, while in configuration #1, it can be seen that the PSS and SSS have the gap of one OFDM symbol. When UE detects the PSS/SSS blindly and finds there is a gap of 1 OFDM symbol, it knows that it is configuration #1 and the symbols where PSS/SSS can be detected are OFDM symbols #1 and #3. The timing synchronization can thus be derived. To distinguish cells, the PCI can be derived based on the combination of the PSS/SSS sequence and the configuration utilized as follows:

$$PCI = 3*N\_ID(1) + N\_ID(2) + N\_ID(3)*504 \quad (1)$$

where $N\_ID(1)$ and $N\_ID(2)$ can be obtained based on PSS/SSS sequence as in the current LTE specification, while $N\_ID(3)$ is determined based on the PSS/SSS configuration, e.g, $N\_ID(3)$=configuration index. Although one cell using configuration #0 and another cell using configuration #1 can choose the same PSS/SSS sequence, distinct PCI can be derived and it can be used for generating other signals, like the reference signal (RS), to mitigate/reduce interference. Though in the example the two configurations are orthogonal in time domain, it can be easily extended to frequency domain orthogonal design, and make each frequency position linked to one gap between PSS and SSS.

When cells themselves choose the PSS/SSS resource, there is the possibility that two cells choose same PSS/SSS configuration, and the same sequence. In this case collision will occur, especially when there is only one PSS/SSS and when there are dense small cell deployments. The second solution is designed to enable time changing of the PSS/SSS used by the cell. One example is shown in FIG. 8. In this example, cell #0 and cell #1 occasionally choose the same PSS/SSS resource #L to use initially, and the resource #L is distinguished by the sequence for PSS/SSS and configuration (that is, configuration as in the first solution). Due to the resulting collision and interference, some UEs cannot synchronize and therefore access neither of the two cells. To avoid the problem, or, after the problem had been detected, the cell can select multiple PSS/SSS resources to use in an alternative way, reducing the possibility of collision with another cell. The number of PSS/SSS resources that can be selected is predefined. In the FIG. 8 example, cell #0 chooses PSS/SSS resource #L and #M for use, while cell #1 chooses PSS/SSS resource #L and #K for use. There is no collision in subframe #P when cell #0 sends PSS/SSS in resource #M, while cell #1 sends PSS/SSS in resource #K.

In case there are no UEs in the cell, the time change of PSS/SSS has no impact. In case there are UEs already served in the cell, the selected PSS/SSS resources can be signaled to UEs, then UEs can derive the PCI correctly. Assuming one UE synchronized to cell #i in subframe #0 based on the PSS/SSS resource #L, then it will know that PSS/SSS resources #K and #L are selected for use by the eNB from eNB signaling. It can be derived that before subframe #P, the PCI can be derived based on PSS/SSS #L, while after subframe #P, the PCI has to be detected based on PSS/SSS subframe #K. That is, UEs know the corresponding PCI based on the detected PSS/SSS sequence/configuration and the multiple PSS/SSS sequences/configurations selected by eNB.

Though in the example, periodic alternating is assumed among the selected PSS/SSS sequences/configurations, aperiodic switching between multiple PSS/SSS sequence/configurations is also possible. Signaling from eNB to UE can enable both schemes. For example, the signaling can take the following form:

Periodic alternation indicator and List of PSS/SSS sequences/configurations;

If the UE detects that the periodic alternation indicator="0", and the current PSS/SSS in use is the ith PSS/SSS in the list, then the UE of one embodiment will assume that next PSS/SSS to be used is the (i+1)th PSS/SSS in the list. It may be used until UE receives further signaling. All of the RS sequence initialization may be based on the (i+1)th PSS/SSS after the transmission time of next PSS/SSS.

There are several advantages to the described approach. The design extends the PSS/SSS multiplexing capacity without ambiguity in synchronization. Interference in PSS/SSS and other signals like reference signal (RS) can be reduced. Using this principle to determine the PCI for cell identification, cells can be distinguished without confusion, even in dense small cell deployment. And employing the described signaling to enable PSS/SSS change in time, interference can be reduced efficiently without significant impact to UEs.

Reference to FIGS. 9 and 10 provides an illustration of the described methods. FIG. 9 shows that in a network configuration in which a cluster of pico cells are not managed by a single evolved node B (eNB), a two-index system 920 may be provided for facilitating access to the small cell components. A first index designating individual small cells may be derived from PSS/SSS signals 922 directly. Or the first index may be derived 924 from the signal position (rather than the content) of the PSS/SSS signals in their frequency division or time division multiplexed arrangement.

A second index identifies a group of small cells and may be provided through one of a choice of means. The second index may be indicated through system or master information block signaling 928. It may be predefined with a list of a plurality of first indexes 930 such that knowledge of the first index that identifies an individual small cell also identifies the cell group to which it belongs. Or the second index may be derived directly from PSS/SSS signals 932. Finally, so that any UE seeking network access is advised of the nature of the cells that may grant that access, if they are small cells, a downlink signal 934 may indicate that a two-index cell system is in use for the cell.

FIG. 10 depicts a management scheme for PSS/SSS configurations that supports the process shown in FIG. 9 wherein PSS/SSS position may indicate first and second index values. A plurality of PSS/SSS signal configurations may be defined 940 with indicators for different TDM/FDM positions. The time/frequency for each PSS/SSS signal configuration can be orthogonal to each other 944 to negate inter-cell interference, while the offset linked to each time/frequency position helps to avoid ambiguity in time/frequency synchronization. After PSS/SSS detection, the physical cell identity (PCI) is derived implicitly 950 based on the PSS/SSS sequence and configuration indicator.

Continuing reference to FIG. 10, another process may be employed. A plurality of PSS/SSS alternating sequences or configurations and indicators may be provided 942 with a predefined maximum number. The PSS/SSS sequence/configurations may be signaled by broadcast or by dedicated signaling 946 to indicate periodic or aperiodic alternation of PSS/SSS configurations. After PSS/SSS detection, the PCI may be derived based on detected PSS/SSS sequence/configuration 952 and the plurality of PSS/SSS sequence/configuration selected by eNB.

As described above, FIGS. 9-10 are flowcharts of a method, system, and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart blocks. These computer program instructions may also be stored in a non-transitory computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 9-10, when executed, convert a computer or processing circuitry into a particular machine configured to perform an example embodiment of the present invention. Accordingly, the operations of Figures x-x define an algorithm for configuring a computer or processing circuitry (e.g., processor) to perform an example embodiment. In some cases, a general purpose computer may be configured to perform the functions shown in FIGS. 9-10 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims Although specific terms are employed herein, they are used in a generic and descriptive sense only and not for purposes of limitation.

The following acronyms and abbreviations have appeared in the Detailed Description above and may also be found in the following claims.
BS Base Station
CA Carrier Aggregation
CRS Common Reference Signal
CSI-RS Channel-State Information Reference Signal
DL Downlink
DRS Digital Reference Signals
ePDCCH Enhanced Physical Downlink Control Channel
eNB Enhanced Node B (Name for Node B in LTE)
HO Handover
ISD Inter-site Distance
LTE Long Term Evolution
LTE-A Long Term Evolution Advanced
MIB Master Information Block
MT Mobile Terminal
NCT New Carrier Type
OFDM Orthogonal Frequency Division Multiplex
Pcell Primary Cell
PCC Primary Cell Carrier
PCI Physical Cell Identity
PDCCH Physical Downlink Control Channel
PSS Primary Synchronization Sequence
PUCCH Physical Uplink Control Channel
RRC Radio Resource Control
SA-NCT Standalone New Carrier Type
SIB System Information Block
Scell Secondary Cell
SSS Secondary Synchronization Sequence
TDM Time Division Multiplex
UE User Equipment
UL Uplink
PDCH Physical Discovery Channel
RRH Remote Radio Head

What is claimed is:

1. A method comprising:
providing a multiple-index system for clusters of small cells in a wireless cellular network, wherein
at least a first index is employed for access to and identification of an individual serving cell within a cluster of small cells, and
at least a second index is employed to indicate a group of small cells for determining mobility control, wherein the indicated group of small cells is configured to allow movement of a user equipment (UE) between a first small cell and a second small cell from the group of small cells, without triggering cell reselection or handover.

2. The method of claim 1, further comprising:
indicating the first index through primary synchronization/secondary synchronization (PSS/SSS) signals.

3. The method of claim 1, further comprising:
indicating the first index through at least a position of a PSS/SSS signal and/or a relative position between PSS and SSS.

4. The method of claim 1, further comprising:
indicating the second index through system information/master information block signals.

5. The method of claim 1, further comprising:
predefining the second index as comprising a plurality of small cells identified by the first index for each small cell.

6. The method of claim 1, further comprising:
indicating the second index through primary/secondary synchronization (PSS/SSS) signals.

7. The method of claim 1, further comprising:
causing an indication to be communicated in downlink signaling that the small cells comprise a multiple-index cell system.

8. The method of claim 1 further comprising:
defining a plurality of primary/secondary synchronization (PSS/SSS) signal configurations, each having an indicator, wherein
each configuration has a different relative time/frequency position of PSS and SSS signals.

9. An apparatus comprising at least one processor, a digital memory associated with the at least one processor, said memory storing computer code instructions which, when executed by the at least one processor, cause the apparatus to perform:
providing a multiple-index system for clusters of small cells in a wireless cellular network, wherein
at least a first index is employed for access to and identification of an individual serving cell within a cluster of small cells, and
at least a second index is employed to indicate a group of small cells for determining mobility control, wherein the indicated group of small cells is configured to allow movement of a user equipment (UE) between a first small cell and a second small cell from the group of small cells, without triggering cell reselection or handover.

10. The apparatus of claim 9, further comprising instructions that cause the apparatus to perform:
indicating the first index through primary synchronization/secondary synchronization (PSS/SSS) signals.

11. The apparatus of claim 10, further comprising instructions that cause the apparatus to perform:
   indicating the second index through system information/master information block signals.

12. The apparatus of claim 10, further comprising instructions that cause the apparatus to perform:
   predefining the second index as comprising a plurality of small cells identified by the first index for each small cell.

13. The apparatus of claim 10, further comprising instructions that cause the apparatus to perform:
   indicating the second index through primary/secondary synchronization (PSS/SSS) signals.

14. The apparatus of claim 9, further comprising instructions that cause the apparatus to perform:
   indicating the first index through at least a position of a PSS/SSS signal and/or a relative position between PSS and SSS.

15. The apparatus of claim 9, further comprising instructions that cause the apparatus to perform:
   causing an indication to be communicated in downlink signaling that the small cells comprise a two-index cell system.

16. The apparatus of claim 9, further comprising instructions that cause the apparatus to perform:
   defining a plurality of primary/secondary synchronization (PSS/SSS) signal configurations, each having an indicator, wherein
   each configuration has a different relative time/frequency position of PSS and SSS signals.

17. The apparatus of claim 16, wherein
   the time/frequency for each defined signal configuration of PSS/SSS is orthogonal to each other.

18. An apparatus comprising at least one processor, a digital memory associated with
   the at least one processor, said memory storing computer code instructions which, when executed by the at least one processor, cause the apparatus to perform:
      receiving an indication that one or more of a cluster of small cells uses a multiple-index system for access to said and control of said small cells in a wireless cellular network, wherein
      at least a first index is employed for access to and identification of an individual serving cell within a cluster of small cells, and
      at least a second index is employed to indicate a group of small cells for determining mobility control, wherein the indicated group of small cells is configured to allow movement of a user equipment (UE) between a first small cell and a second small cell from the group of small cells, without triggering cell reselection or handover.

19. The apparatus of claim 18, further comprising instructions that cause the apparatus to perform:
   deriving the first index from primary synchronization/secondary synchronization (PSS/SSS) signals.

20. The apparatus of claim 18, further comprising instructions that cause the apparatus to perform:
   deriving the first index through at least a position of a PSS/SSS signal and/or a relative position between PSS and SSS.

* * * * *